United States Patent
Dave et al.

(10) Patent No.: US 12,221,856 B2
(45) Date of Patent: Feb. 11, 2025

(54) PRESSURE REGULATION MECHANISM FOR DOWNHOLE WELL TOOLS

(71) Applicant: Halliburton Energy Services, Inc., Houston, TX (US)

(72) Inventors: Jalpan P. Dave, Singapore (SG); Shanu Thottungal Eldho, Singapore (SG); Ryan T. Humphrey, Singapore (SG); Sooriyah Thangarajoo, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/313,811

(22) Filed: May 8, 2023

(65) Prior Publication Data
US 2024/0376797 A1 Nov. 14, 2024

(51) Int. Cl.
*E21B 34/10* (2006.01)
*E21B 33/128* (2006.01)
(Continued)

(52) U.S. Cl.
CPC .......... *E21B 34/10* (2013.01); *E21B 33/1285* (2013.01); *G05D 16/028* (2019.01); *G05D 16/0404* (2019.01)

(58) Field of Classification Search
CPC ...... E21B 33/1208; E21B 23/06; E21B 23/04; E21B 23/0412; E21B 23/0416;
(Continued)

(56) References Cited

U.S. PATENT DOCUMENTS 3,135,328 A 6/1964 Cherry et al.
3,177,938 A * 4/1965 Roussin .............. E21B 17/1021
166/243

(Continued)

FOREIGN PATENT DOCUMENTS

CN 102071900 5/2011
EP 2767669 8/2014
(Continued)

OTHER PUBLICATIONS

"PCT Application No. PCT/US2023/066783, International Search Report and Written Opinion", Feb. 6, 2024, 10 pages.
(Continued)

*Primary Examiner* — Steven A MacDonald
(74) *Attorney, Agent, or Firm* — DeLizio, Peacock, Lewin & Guerra LLP

(57) ABSTRACT

Systems, methods, and apparatus for regulating pressure within a well tool. In some aspects, the well tool may include a cylinder, a setting chamber, and a first flow metering device and a second flow metering device installed in the cylinder. The first flow metering device having a first pressure threshold and the second flow metering device having a second pressure threshold may be configured to regulate an internal chamber pressure inside the setting chamber to reduce a collapse pressure or a pressure differential at the cylinder. The first flow metering device may be configured to allow an external pressure greater than a first pressure threshold to enter the setting chamber during a hydrocarbon recovery operation, and the second flow metering device may be configured to allow the internal chamber pressure greater than a second pressure threshold to exit the setting chamber after the hydrocarbon recovery operation.

17 Claims, 6 Drawing Sheets

(51) Int. Cl.
*G05D 16/00* (2006.01)
*G05D 16/04* (2006.01)

(58) Field of Classification Search
CPC .... E21B 23/042; E21B 34/10; E21B 33/1285; G05D 16/028; G05D 16/0404
See application file for complete search history.

(56) References Cited

U.S. PATENT DOCUMENTS

| | | | |
|---|---|---|---|
| 3,853,177 A | 12/1974 | Mott | |
| 3,856,085 A | 12/1974 | Holden et al. | |
| 4,403,660 A | 9/1983 | Coone | |
| 4,941,534 A | 7/1990 | Berzin | |
| 5,044,433 A | 9/1991 | Rubbo et al. | |
| 5,375,662 A | 12/1994 | Echols, III et al. | |
| 5,400,855 A * | 3/1995 | Stepp | E21B 33/127 166/151 |
| 5,404,956 A | 4/1995 | Bohlen et al. | |
| 7,631,699 B2 | 12/2009 | Cisneros | |
| 9,995,099 B2 * | 6/2018 | Halfmann | E21B 17/07 |
| 11,091,975 B2 * | 8/2021 | Roselier | E21B 33/1277 |
| 2007/0246225 A1 | 10/2007 | Hailey, Jr. | |
| 2008/0029275 A1 | 2/2008 | Cisneros | |
| 2009/0038796 A1 | 2/2009 | King | |
| 2009/0283279 A1 * | 11/2009 | Patel | E21B 33/129 166/382 |
| 2010/0108148 A1 | 5/2010 | Chen et al. | |
| 2010/0282469 A1 | 11/2010 | Richard et al. | |
| 2010/0307832 A1 * | 12/2010 | Mock | E21B 23/042 175/99 |
| 2011/0147014 A1 | 6/2011 | Chen et al. | |
| 2011/0186307 A1 | 8/2011 | Derby | |
| 2012/0125619 A1 * | 5/2012 | Wood | E21B 33/1212 166/308.1 |
| 2012/0186829 A1 * | 7/2012 | Watson | E21B 23/04 166/212 |
| 2012/0292013 A1 | 11/2012 | Munshi | |
| 2013/0180715 A1 * | 7/2013 | Harris | E21B 33/04 166/208 |
| 2014/0209822 A1 * | 7/2014 | Mathiesen | E21B 34/08 251/11 |
| 2015/0198016 A1 | 7/2015 | Anglais | |
| 2015/0218916 A1 | 8/2015 | Richards et al. | |
| 2016/0024896 A1 * | 1/2016 | Johnson | E21B 33/12 166/185 |
| 2016/0108700 A1 * | 4/2016 | Halfmann | E21B 23/0413 166/321 |
| 2016/0194933 A1 | 7/2016 | O'brien et al. | |
| 2016/0230505 A1 | 8/2016 | Garcia et al. | |
| 2016/0230509 A1 | 8/2016 | Lopez | |
| 2016/0251920 A1 | 9/2016 | Galley et al. | |
| 2016/0251922 A1 | 9/2016 | Eldho | |
| 2016/0258245 A1 | 9/2016 | Eldho | |
| 2017/0037692 A1 | 2/2017 | Eldho et al. | |
| 2018/0230770 A1 * | 8/2018 | Oag | E21B 43/11852 |
| 2018/0305999 A1 | 10/2018 | Dave et al. | |
| 2018/0320480 A1 | 11/2018 | Jelly | |
| 2020/0072004 A1 * | 3/2020 | Morin | B01D 21/003 |
| 2020/0116269 A1 * | 4/2020 | El Mallawany | E21B 34/10 |
| 2020/0240235 A1 | 7/2020 | Fripp et al. | |
| 2020/0325749 A1 * | 10/2020 | Fripp | E21B 33/10 |
| 2020/0370384 A1 * | 11/2020 | Provost | E21B 33/12 |
| 2020/0370391 A1 | 11/2020 | Fripp et al. | |
| 2021/0040810 A1 | 2/2021 | Evers | |
| 2021/0140255 A1 | 5/2021 | Greci et al. | |
| 2021/0207472 A1 | 7/2021 | Dave | |
| 2021/0324694 A1 * | 10/2021 | Fripp | E21B 23/04 |
| 2022/0049577 A1 * | 2/2022 | Holderman | E21B 33/1212 |
| 2022/0178222 A1 * | 6/2022 | Fripp | E21B 33/1208 |
| 2022/0307342 A1 * | 9/2022 | Kruger | E21B 33/1275 |
| 2022/0341280 A1 * | 10/2022 | Holderman | E21B 33/1208 |
| 2023/0072189 A1 | 3/2023 | Mothilal et al. | |
| 2023/0116346 A1 | 4/2023 | Dave et al. | |
| 2023/0287761 A1 * | 9/2023 | Cameron | E21B 34/066 |

FOREIGN PATENT DOCUMENTS

| | | |
|---|---|---|
| WO | 2011015972 | 2/2011 |
| WO | 2021165103 | 8/2021 |

OTHER PUBLICATIONS

"International Search Report and Written Opinion, PCT Patent Application No. PCT/US2021/050711", May 26, 22 , 8 pages.
"International Search Report and Written Opinion, PCT Patent Application No. PCT/US2021/056691", Jul. 6, 22 , 9 pages.
"Ovidius Expanding Isolation System", Halliburton, Well Completions, Ovidius Expanding Isolation System, H013865, Apr. 2021. Apr. 1, 2021 , 2 pages.
"U.S. Appl. No. 17/469,693 Office Action", Jan. 18, 2023, 13 pages.
"U.S. Appl. No. 17/499,936 Office Action", Nov. 8, 2022, 18 pages.

* cited by examiner

PRESSURE REGULATION MECHANISM FOR DOWNHOLE WELL TOOLS

TECHNICAL FIELD

The present invention relates generally to energy services, and more specifically to a mechanism for pressure regulation in downhole well tools.

BACKGROUND

A well system may utilize various well tools to perform hydrocarbon recovery operations. For example, a well system may use one or more well packers to perform fracturing operations downhole in one or more zones of the subsurface formation. Various pressures internal or external to the well packer during operation of the well system may result in burst pressure and collapse pressure at a cylinder of the well packer. Various designs of well packers may attempt to regulate the pressures seen by the components of the well packers.

DESCRIPTION

The description that follows includes example systems, methods, techniques, and program flows that describe aspects of the disclosure. However, it is understood that this disclosure may be practiced without these specific details. For instance, this disclosure refers to reservoir modeling in illustrative examples. Aspects of this disclosure can be instead applied to other types of models involving spatiotemporal datasets. In other instances, well-known instruction instances, protocols, structures, and techniques have not been shown in detail to avoid confusion.

Figure 1:
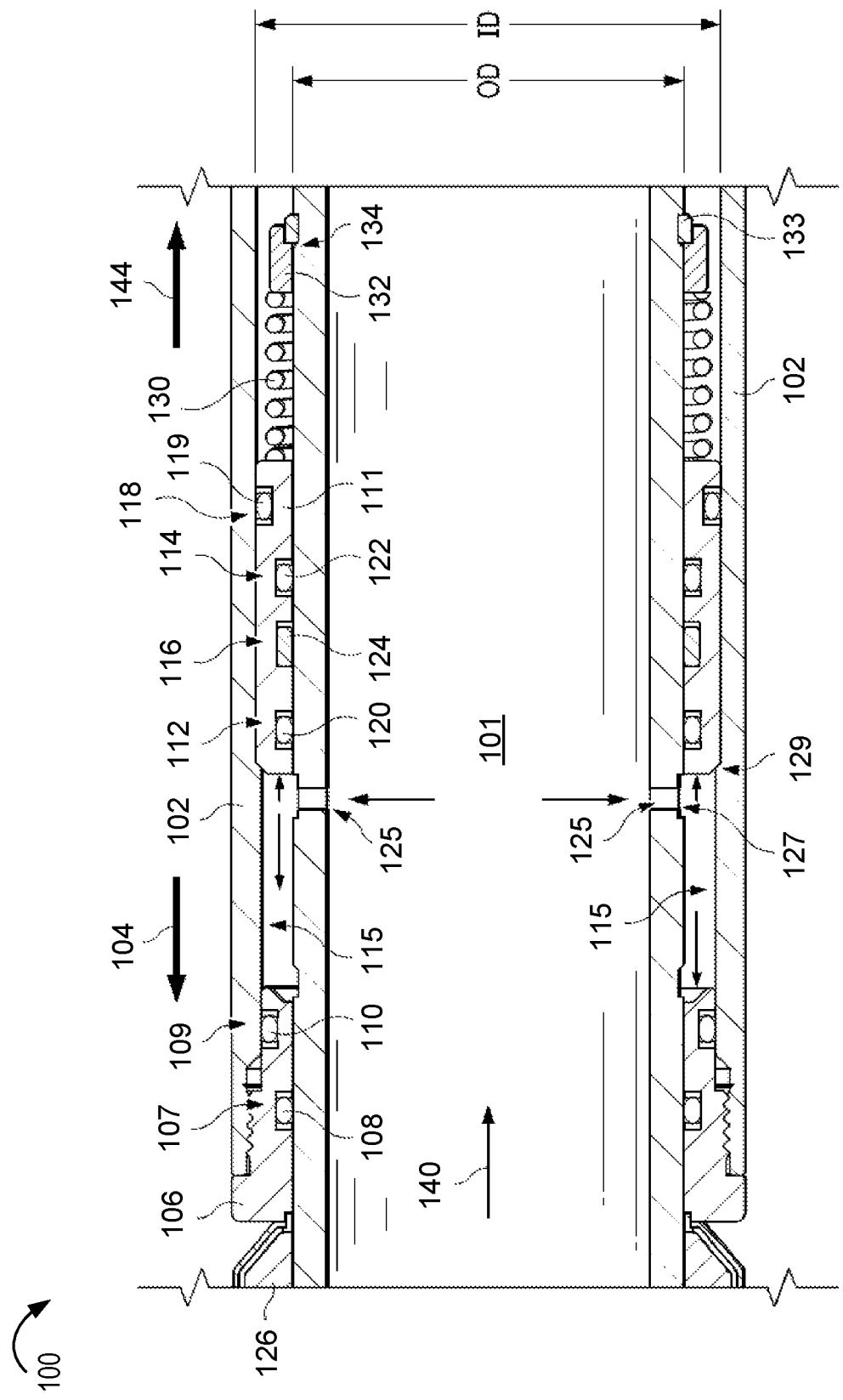
FIG. 1 depicts a cutaway view of an example well packer of a well system, according to some implementations.
Figure 6:
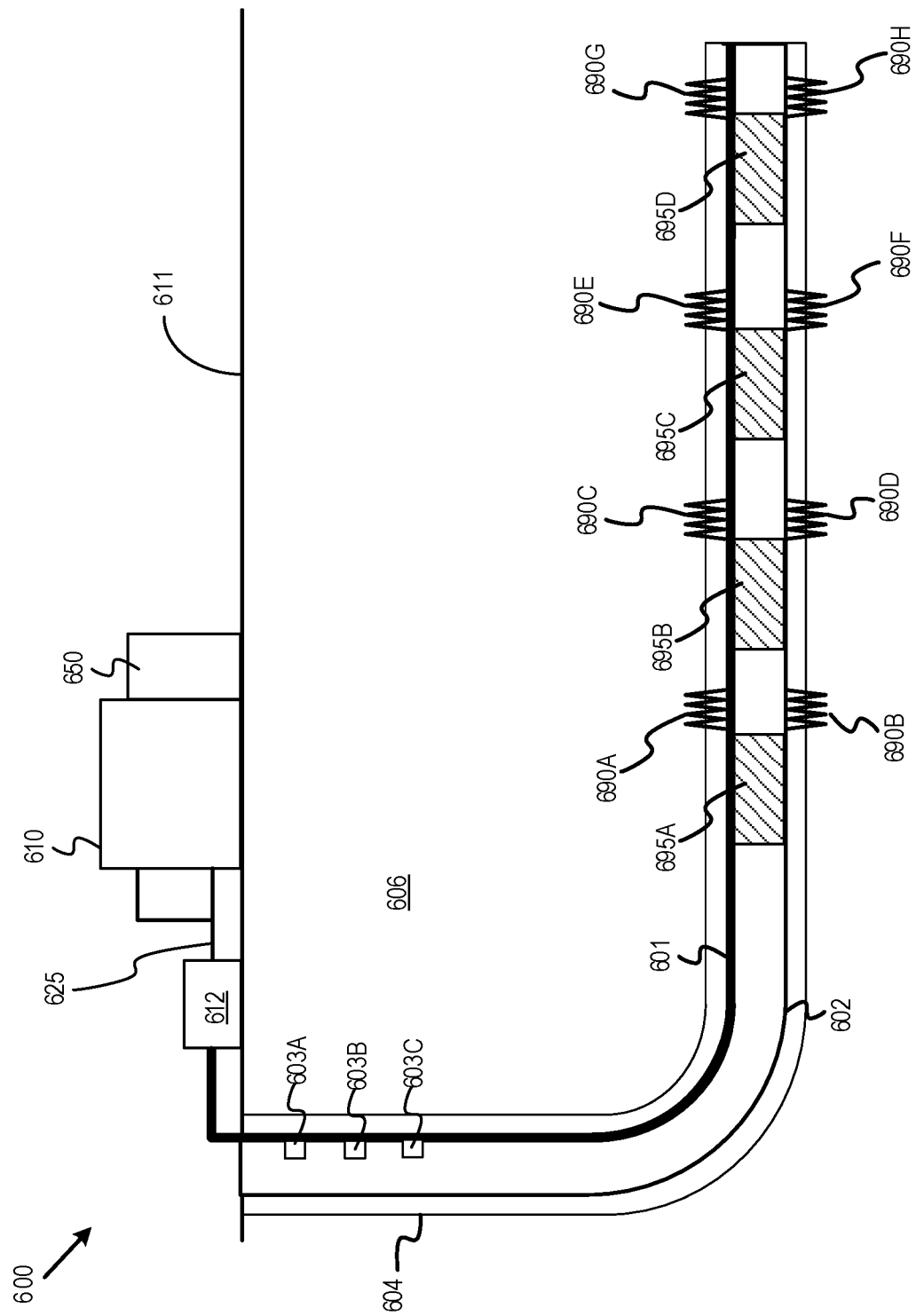
FIG. 6 is a schematic diagram of an example well system that includes fracturing operations, according to some implementations.

FIG. 1 depicts a cutaway view of an example well packer 100 of a well system, according to some implementations. The well packer 100 may be the sole well packer of the well system or may be one of multiple well packers of the well system. For example, FIG. 6 illustrates a well system that uses multiple well tools, such as multiple well packers, to perform fracturing operations. The well packer 100 may include a setting mechanism that includes a mandrel 101, a cylinder 102, a retainer 106, and a piston 111. The setting mechanism, which also may be referred to as an actuating mechanism, may set the well packer 100 when performing oil and gas (or hydrocarbon) recovery operations, such as fracturing operations, as further described herein. A setting chamber 115 of the well packer 100 may be an internal chamber that is formed by the outer diameter (OD) of the mandrel 101, the inner diameter (ID) of the cylinder 102, the retainer 106 and the piston 111. In some implementations, flow metering devices (not shown) may be installed in the cylinder 102 to regulate the pressure within the setting chamber 115, as further described below in FIGS. 2-4.

The well packer 100 may also include a seal element 126. The retainer 106 may be positioned between the OD of the mandrel 101 and the ID of the cylinder 102, and may be movable along the OD of the mandrel 101 to set (e.g., radially expand) the seal element 126. For example, the retainer 106 may compress the seal element 126 to set the seal element 126. The retainer 106 may include a recess 107 containing a seal 108, and the recess 107 and the seal 108 may extend along the OD of the mandrel 101. The retainer 106 also may include a recess 109 containing a seal 110, and the recess 109 and the seal 110 may extend along the ID of the cylinder 102.

The piston 111 may also be positioned between the OD of the mandrel 101 and the ID of the cylinder 102, and may be movable along the OD of the mandrel 101. The piston 111 may include recesses 112 and 114 that may extend along the OD of the mandrel 101 and may include a seal 120 and a seal 122, respectively. The piston 111 may also include a recess 116 and a recess 118. The recess 116 may extend along the OD of the mandrel 101 and may include a component 124 to restrict the movement of the piston 111 once it closes one or more setting chamber ports 125. The one or more setting chamber ports 125 may also be referred to as chamber ports or fluid ports. The setting chamber ports 125 may allow fluid to flow from within a bore of the mandrel 101 into the setting chamber 115. The component 124 may be any type of component that can close the one or more setting chamber ports 125, isolate the setting chamber 115, and restrict the movement of the piston 111. For example, the component 124 may be a plug, snap ring, or a burst disk, among others. The recess 118 may extend along the ID of the cylinder 102 and may include a seal 119. The cylinder 102 may include a no-go shoulder 129 to secure the piston 111 in place against the OD of the mandrel 101. This may ensure the piston 111 doesn't move up to close the setting chamber ports 125 due to unintended pressure spikes. In some implementations, the setting chamber ports 125 may be positioned on opposing sides of the mandrel 101. In some implementations, the setting chamber ports 125 may be positioned in recesses 127. The recesses 127 may be configured to receive the component 124, for example, to secure the component 124 and the piston 111 in place, close the setting chamber ports 125, and isolate the setting chamber 115 from the mandrel 101.

A spring 130 may be positioned adjacent to the piston 111. The spring 130 may be compressed against a stopper 132. The stopper 132 may be, for example, a tubular member (e.g., a ring) positioned around the OD of the mandrel 101, which may be secured in place via a fastener 133. The fastener 133 may be, for example, a snap ring positioned in a groove 134 that extends along the OD of the mandrel 101.

To set or actuate the setting mechanism of the well packer 100, fluid 140 may pass into the setting chamber 115 from the mandrel 101 via the setting chamber ports 125. During setting or actuation, the cylinder 102 is subject to fluid pressure (which may be referred to as a setting pressure). The setting pressure may simultaneously cause the retainer 106 and the cylinder 102 to move in an axial direction (e.g., indicated by the directional arrow 104, which may be in an up-hole direction) along the mandrel 101 to set the sealing element 126, and the piston 111 to move in an opposite direction (e.g., indicated by a directional arrow 144, which may be in a downhole direction) to compress or energize the spring 130 against the stopper 132.

Figure 2:
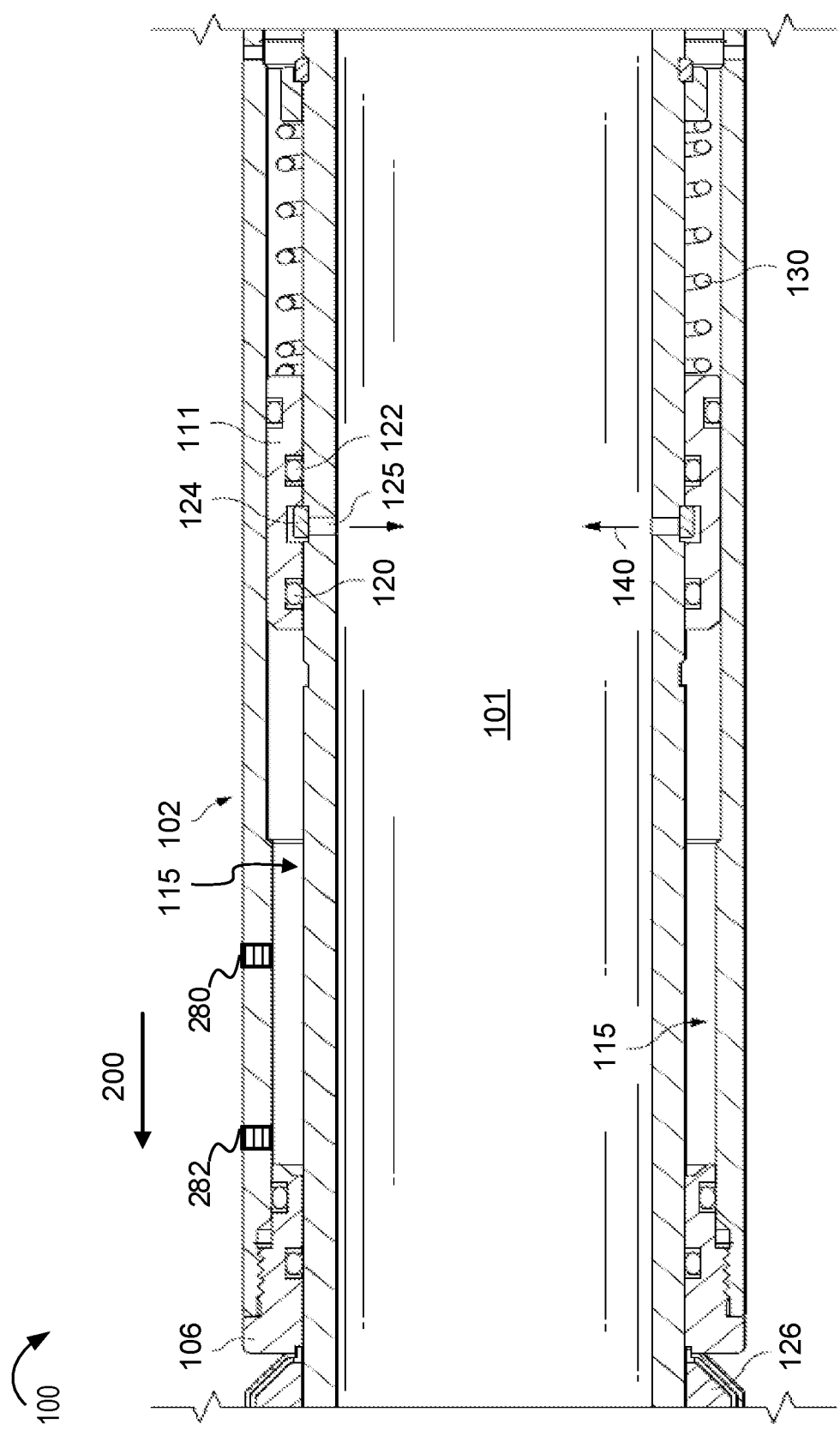
FIG. 2 depicts another cutaway view of an example well packer of a well system including an isolated setting chamber and flow metering devices positioned in the cylinder of the setting chamber, according to some implementations.

FIG. 2 depicts another cutaway view of an example well packer 100 of a well system including an isolated setting chamber and flow metering devices positioned in the cylinder of the setting chamber, according to some implementations. After the setting process described in FIG. 1 is complete, pressure may be bled or reduced from the setting chamber 115, via the setting chamber ports 125, and the piston 111 may move to seal the one or more setting chamber ports 125 due to expansion of the spring 130 and reduction of pressure within the setting chamber 115. The setting chamber 115 is isolated from the mandrel 101 when the component 124 of the piston 111 closes the one or more setting chamber ports 125.

When the fluid 140 is released from the setting chamber 115, the internal chamber pressure inside the setting chamber 115 is reduced. The reduction in the internal chamber pressure causes the spring 130 to expand, which moves the piston 111 in the direction of the arrow 200. The movement of the piston 111 causes the component 124 to close the one or more setting chamber ports 125, seals the one or more setting chamber ports using the seals 120 and 122, and maintains the retainer 106 to compress the sealing element 126. In addition to closing the one or more setting chamber ports 125, the component 124 may lock the piston 111 in place. The seals 120 and 122 may provide a sealing barrier that assists the isolation of the setting chamber 115 from the pressure in the mandrel 101 (which may be referred to as tubing pressure). Isolating the setting chamber 115 from the pressure in the mandrel 101 may reduce the burst pressure at the cylinder 102.

In a well system having multiple well packers, such as the well system shown in FIG. 6 that is used for fracturing operations, the setting chambers in each of the well packers can be isolated after setting all of the well packers at a lower pressure. For example, if the fracturing operation is performed at 15,000 psi (or 15 ksi), the setting chambers in each of the well packers can be isolated after setting all of the well packers at a lower pressure, such as 5 ksi, so that the fracturing operation can be performed in each zone at, for example, 15 ksi without the cylinder (such as cylinder 102) of each of the setting chambers (such as the setting chamber 115) seeing 15 ksi burst pressure during the fracturing of lower zones. Typically, when lower zones are fractured, all the well packers above the lower zone see the high pressure, such as a 15 ksi burst pressure, in the setting chambers if the setting chambers are not isolated. Hence, the different components and elements, such as the setting mechanism, of the well packers see the high pressure (such as the 15 ksi pressure). Since the setting chambers typically see the high pressure associated with the fracturing operation (such as the 15 ksi pressure) when the setting chambers are not isolated, the cylinder of each of the setting chambers typically has to be designed for the high pressure, which increases the cost of the well packers and results in higher setting pressures. However, isolating the setting chambers as described herein can reduce the burst pressure in the setting chamber and at the cylinder. Since the burst pressure at the cylinder is reduced, the cost of the cylinder design and thus the overall cost of the well packer may be reduced.

As shown in FIG. 2, the well packer 100 may also include a flow metering device 280) and a flow metering device 282.

The flow metering devices 280 and 282 may be installed in the cylinder 102. The flow metering devices 280 and 282 may be used to regulate the internal chamber pressure of the setting chamber 115 in order to reduce the collapse pressure, as further described in FIG. 3.

Figure 3:
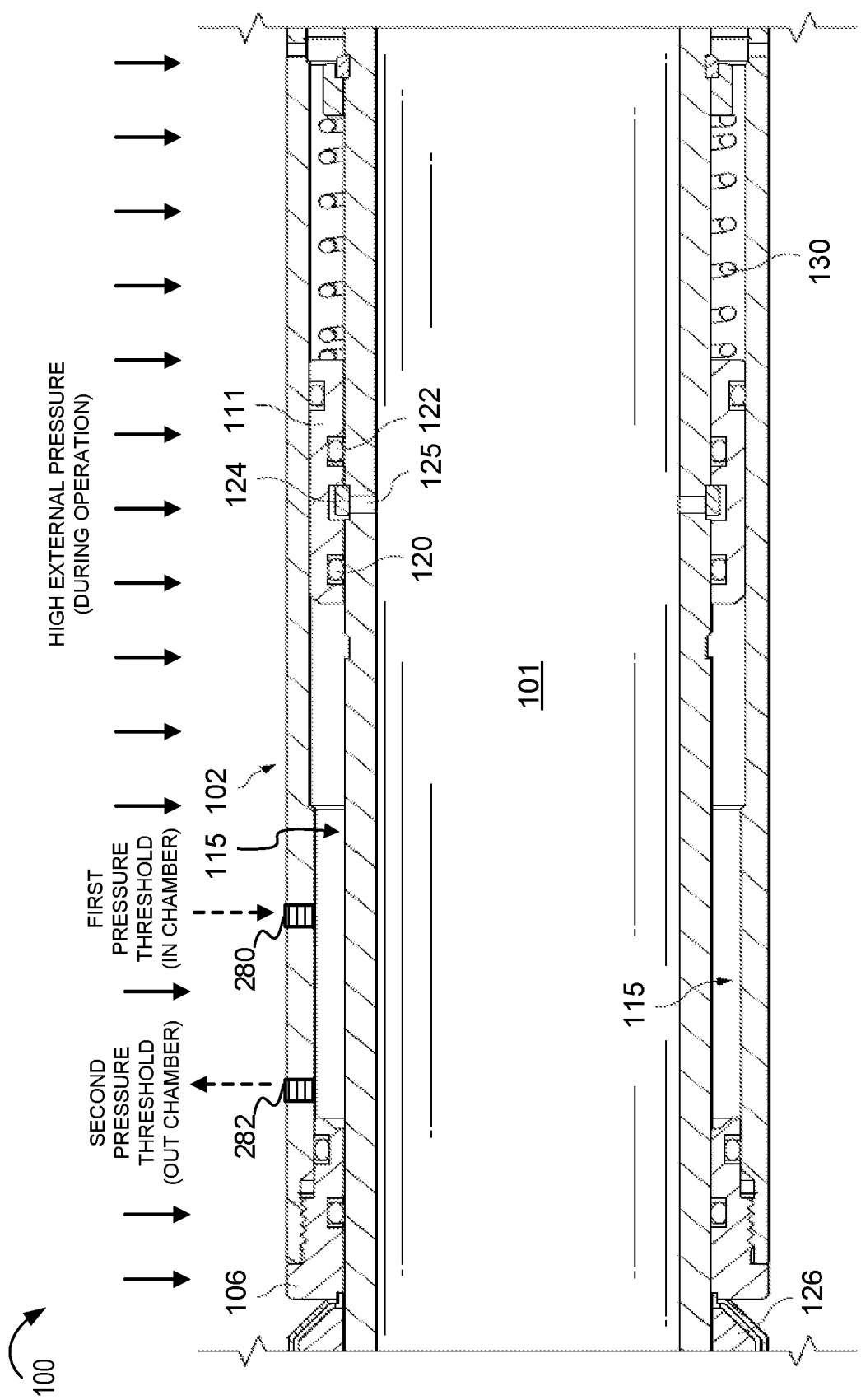
FIG. 3 depicts another cutaway view of an example well packer of a well system including an isolated setting chamber and flow metering devices positioned in the cylinder of the setting chamber, according to some implementations.

FIG. 3 depicts another cutaway view of an example well packer 100 of a well system including an isolated setting chamber and flow metering devices positioned in the cylinder of the setting chamber, according to some implementations. As shown in FIG. 3, the flow metering devices 280 and 282 may be installed in the cylinder 102 of the setting chamber 115 of the well packer 100.

After isolating the setting chamber 115 as described in FIG. 2, the hydrocarbon recovery operations, such as the fracturing operations, may be initiated at a high pressure, such as 15 ksi. Typically, when the setting chamber 115 does not include flow metering devices and the setting chamber 115 is isolated, the setting chamber 115 of the well packer 100 that is adjacent to the zone being fractured can see a high collapse pressure at the cylinder 102 of the setting chamber 115. For example, if the fracturing operation is being performed at 15 ksi and the setting chamber 115 is isolated as described in FIG. 2, the differential pressure resulting from the high external pressure and the isolated setting chamber 115 can exert a high collapse pressure at the cylinder 102 of the well packer that is adjacent to the zone being fractured.

In some implementations, for each of the one or more well packers in the well system, the flow metering devices 280) and 282 may be installed in the cylinder 102 of the setting chamber 115 to regulate the internal chamber pressure within the setting chamber 115 to reduce the collapse pressure. A non-limiting example of the flow metering devices 280 and 282 may be check valves, or any type of pressure regulating mechanisms. The flow metering device 280 may be designed and configured to allow external pressure in excess of a first pressure threshold to enter the cylinder 102 of the setting chamber 115. A non-limiting example of the first pressure threshold may be 500 psi. However, the first pressure threshold may be any value that results in a reduced or low pressure differential between the external pressure and the internal chamber pressure. The flow metering device 282 may be designed and configured to allow an internal chamber pressure in excess of a second pressure threshold to exit the cylinder 102 of the setting chamber 115. A non-limiting example of the second pressure threshold may be 5 ksi. However, the second pressure threshold may be any value that maintains a sufficient setting pressure within the setting chamber 115, as further described below.

In the non-limiting example when the fracturing operation is performed at a high pressure, such as 15 ksi, the flow metering devices 280 and 282 work in tandem to build up an internal chamber pressure of 14.5 ksi, since the first pressure threshold allows the external pressure that exceeds 500 psi to enter the cylinder 102 of the setting chamber 115. Hence, the cylinder 102 of the setting chamber 115 may only see a 500 psi collapse pressure (or pressure differential) and the mandrel 101 may only see a 500 psi burst pressure (or pressure differential). As noted herein, the values described in the examples above, such as the values for the high-pressure fracking operation, the first pressure threshold of the flow metering device 280, the second pressure threshold of the flow metering device 282, and the various burst and collapse pressures (or pressure differentials), are all non-limiting example values and the values may vary as needed.

An additional operation of the flow metering device 282 after the fracturing operation is stopped is described below in FIG. 4.

Figure 4:
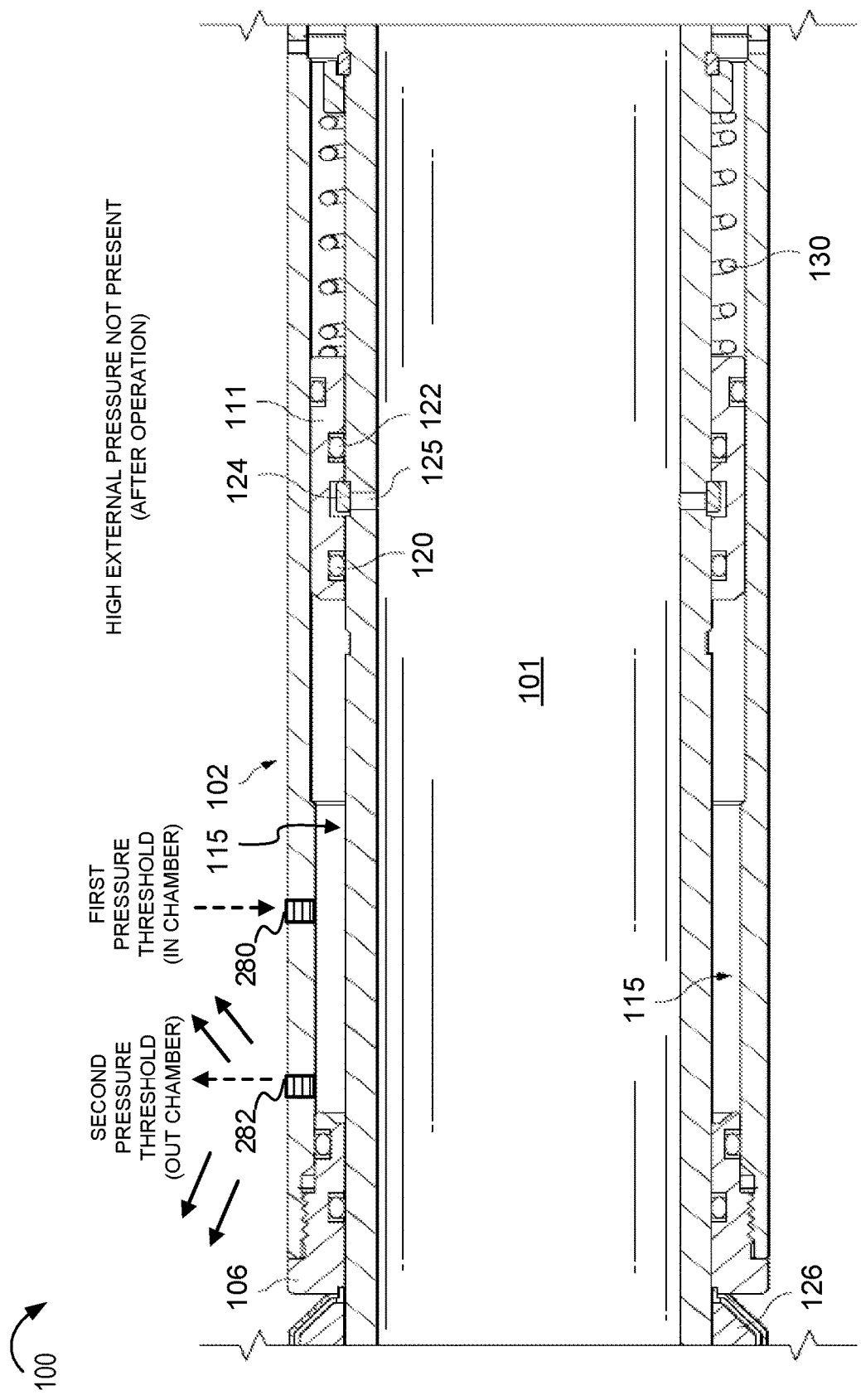
FIG. 4 depicts another cutaway view of an example well packer of a well system including an isolated setting chamber and flow metering devices positioned in the cylinder of the setting chamber, according to some implementations.

FIG. 4 depicts another cutaway view of an example well packer 100 of a well system including an isolated setting chamber and flow metering devices positioned in the cylinder of the setting chamber, according to some implementations.

After the fracturing operation is stopped and the internal chamber pressure is bled or released, the flow metering device 282 may release the internal chamber pressure that is in excess of the second pressure threshold. In the non-limiting example described above, the flow metering device 282 may release the internal chamber pressure that is in excess of 5 ksi. Thus, the flow metering device 282 can maintain sufficient pressure inside the setting chamber 115 to apply a setting load onto the setting elements in the setting chamber 115 (such as the setting or actuating mechanism) to energize the well packer 100 in case there is any slack after the fracturing operation (such as any slack in the sealing element of the well packer 100).

Installing the flow metering devices 280 and 282 in the cylinder 102 of the well packer 100 may mitigate excessive pressure differential across the cylinder 102 and other well packer components after setting chamber isolation. Since the differential pressure and the collapse pressure at the cylinder 102 is reduced, the cost of the cylinder design and thus the overall cost of the well packer may be reduced. As described above, the pressure ratings and other features of the flow metering devices 280 and 282 can be adjusted and customized for other pressure ratings and various other designs. In some implementations, the well packer 100 may be configured as either a mechanical hydraulic packer or a mechanical hydrostatic packer. It is noted, however, that in other implementations the well packer 100 may be another type of packer.

In some implementations, similar to the examples described above, installing the flow metering devices 280 and 282 in high hydrostatic tools, such as high hydrostatic packers, can help regulate the internal chamber pressure. For example, a hydrostatic well packer that will be run to depths where the hydrostatic pressure is, for example, 30 ksi will need to have seals and other components designed for 30 ksi. When the setting chamber of the hydrostatic packer is in a vacuum state, the collapse pressure at the cylinder of the hydrostatic packer may be 30 ksi when flow metering devices are not used. By adding the flow metering devices 280 and 282 at the cylinder of the setting chamber, the collapse pressure (or pressure differential) may be greatly reduced. For example, the first pressure threshold of the flow metering device 280 may allow an external pressure in excess of 500 psi to enter the chamber. Thus, in this non-limiting example, the pressure differential and the collapse pressure may be limited to 500 psi. Furthermore, in another non-limiting example, the second pressure threshold of the flow metering device 282 may allow an internal chamber pressure that exceeds 15 ksi to exit the chamber in order to maintain a setting pressure. When it is desired to set the packer, the rupturing of the rupture disk will bring the setting chamber up to the 30 ksi hydrostatic, thereby still yielding a setting pressure differential of 15 ksi, which is normally sufficient to set the packer. Thus, the packer components may only need to be designed to withstand 15 ksi pressures (such as pressure differential), instead of 30 ksi pressures. As noted herein, the values described in the examples above, such as the values for the high-pressure fracking operation, the first pressure threshold of the flow metering device 280, the second pressure threshold of the flow metering device 282, and the various burst and collapse pressures (or pressure differentials), are all non-limiting example values and the values may vary as needed.

Figure 5:
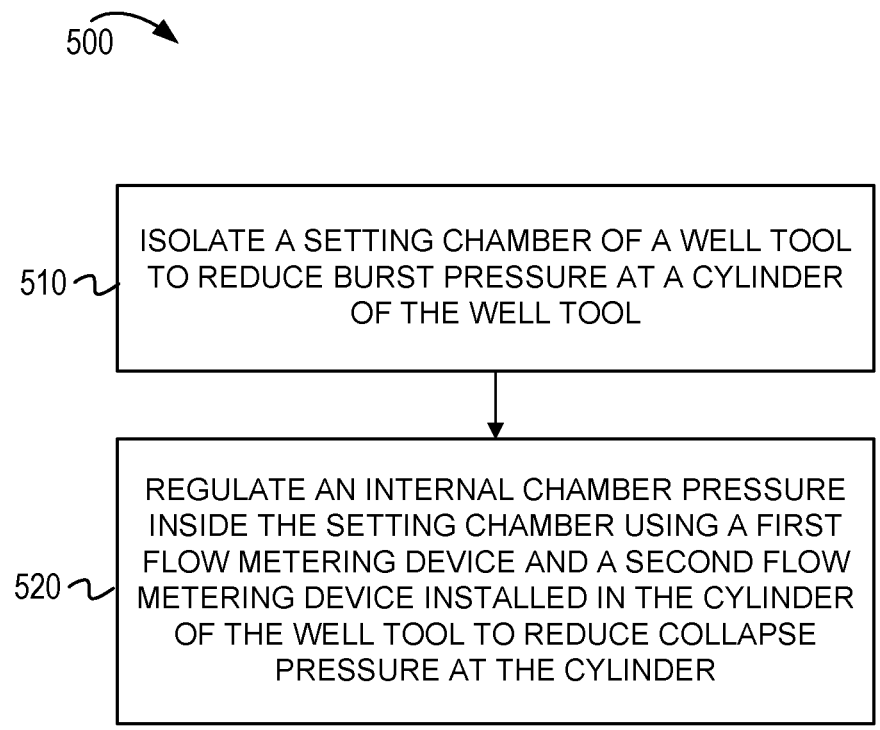
FIG. 5 is a flowchart of example operations for regulating pressure in a well tool, according to some implementations.

FIG. 5 is a flowchart of example operations for regulating pressure in a well tool, according to some implementations. The operations may include isolating a setting chamber of the well tool to reduce burst pressure at a cylinder of the well tool (block 510). The operations may include regulating an internal chamber pressure inside the setting chamber using a first flow metering device and a second flow metering device installed on the cylinder of the well tool to reduce collapse pressure at the cylinder (block 520).

In some implementations, the operations may further include the first flow metering device allowing an external pressure greater than a first pressure threshold to enter the setting chamber during a hydrocarbon recovery operation using the well tool, and the second flow metering device allowing the internal chamber pressure greater than a second pressure threshold to exit the setting chamber after the hydrocarbon recovery operation. In some implementations, the operations may further include limiting a pressure differential between the inside of the setting chamber and external to the cylinder during the hydrocarbon recovery operation to the first pressure threshold of the first flow metering device to reduce the collapse pressure at the cylinder. In some implementations, the operations may further include maintaining the internal chamber pressure at the second pressure threshold of the second flow metering device after the hydrocarbon recovery operation to maintain a setting pressure within the setting chamber. In some implementations, the operations may further include an actuating mechanism isolating the setting chamber from a mandrel of the well tool by sealing a setting chamber port to reduce burst pressure at the cylinder.

FIG. 6 is a schematic diagram of an example well system that includes fracturing operations, according to some implementations. A well system 600 may comprise a wellbore 604 in a subsurface formation 606. The wellbore 604 may include a casing 602 and a number of perforations 690A-690G being made in the casing 602 at different depths as part of hydraulic fracturing to allow hydraulic communication between the subsurface formation 606 and the casing 602 and to allow fracturing at different zones. The well system 600 may also include well packers 695A-695D. Each of the well packers 695A-695D may be configured to implement the features described above with reference to FIGS. 1-5 to regulate in a setting chamber. In some implementations, each of the well packers 695A-695D may be configured to isolate the setting chamber to reduce burst pressure at a cylinder of the well packer, as described above in FIGS. 1-5. Furthermore, each of the well packers 695A-695D may be configured to regulate an internal chamber pressure inside the setting chamber using a first flow metering device and a second flow metering device installed on the cylinder of the well packer to reduce collapse 30) pressure at the cylinder, as described above in FIGS. 1-5.

In some implementations, the well system 600 also may include a fiber optic cable 601. The fiber optic cable 601 may be cemented in place in the annular space between the casing 602 of the wellbore 604 and the subsurface formation 606. In some implementations, the fiber optic cable 601 may be clamped to the outside of the casing 602 during deployment and protected by centralizers and cross coupling clamps. The fiber optic cable 601 may house one or more optical fibers, and the optical fibers may be single mode fibers, multi-mode fibers, or a combination of single mode and multi-mode optical fibers.

In some implementations, the fiber optic cable 601 may be used for distributed sensing where acoustic, strain, and temperature data may be collected. The data may be collected at various positions distributed along the fiber optic cable 601. For example, data may be collected every 1-3 ft along the full length of the fiber optic cable 601. The fiber optic cable 601 may be included with coiled tubing, wireline, loose fiber using coiled tubing, or gravity deployed fiber coils that unwind the fiber as the coils are moved in the wellbore 604. The fiber optic cable 601 also may be deployed with pumped down coils and/or self-propelled containers. Additional deployment options for the fiber optic cable 601 may include coil tubing and wireline deployed coils where the fiber optic cable 601 is anchored at the toe of the wellbore 604. In such embodiments, the fiber optic cable 601 may be deployed when the wireline or coiled tubing is removed from the wellbore 604. The distribution of sensors shown in FIG. 6 is for example purposes only. Any suitable sensor deployment may be used. For example, the well system 600 may include fiber optic cable deployed sensors or sensors cemented into the casing. Different types of sensors deployments also may be combined in a single well, such as including both sensors cemented to the casing and sensors in plugs, flow metering devices, etc. in a single well system.

In some implementations, a fiber optic interrogation unit 612 may be located on the surface 611 of the well system 600. The fiber optic interrogation unit 612 may be directly coupled to the fiber optic cable 601. Alternatively, the fiber optic interrogation unit 612 may be coupled to a fiber stretcher module, wherein the fiber stretcher module is coupled to the fiber optic cable 601. The fiber optic interrogation unit 612 may receive measurement values taken and/or transmitted along the length of the fiber optic cable 601 such as acoustic, temperature, strain, etc. The fiber optic interrogation unit 612 may be electrically connected to a digitizer to convert optically transmitted measurements into digitized measurements. The well system 600 may contain multiple sensors, such as sensors 603A-C. There may be any suitable number of sensors placed at any suitable location in the wellbore 604. The sensors 603A-C may include pressure sensors, distributed fiber optic sensors, point temperature sensors, point acoustic sensors, interferometric sensors or point strain sensors. Distributed fiber optic sensors may be capable of measuring distributed acoustic data, distributed temperature data, and distributed strain data. Any of the sensors 603A-C may be communicatively coupled (not shown) to other components of the well system 600 (e.g., the computer 610). In some implementations, the sensors 603A-C may be cemented to a casing 602.

In some implementations, a computer 610 may receive the electrically transmitted measurements from the fiber optic interrogation unit 612 using a connector 625. The computer 610 may include a signal processor to perform various signal processing operations on signals captured by the fiber optic interrogation unit 612 and/or other components of the well system 600. The computer 610 may have one or more processors and a memory device to analyze the measurements and graphically represent analysis results on the display device 650.

In some implementations, the fiber optic interrogation unit 612 may operate using various sensing principles including but not limited to amplitude-based sensing systems like Distributed Temperature Sensing (DTS), DAS, Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and, in particular, coherent Rayleigh scattering. A DSS system may be a strain sensing system using dynamic strain measurements based on interferometric sensors (e.g., sensors 603A-C) or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

In some implementations, the fiber optic interrogation unit 612 may measure changes in optical fiber properties between two points in the optical fiber at any given point, and these two measurement points move along the optical sensing fiber as light travels along the optical 30) fiber. Changes in optical properties may be induced by strain, vibration, acoustic signals and/or temperature as a result of the fluid flow. Phase and intensity based interferometric sensing systems may be sensitive to temperature and mechanical, as well as acoustically induced, vibrations. The fiber optic interrogation unit 612 may capture DAS data in the time domain. One or more components of the well system 600 may convert the DAS data from the time domain to frequency domain data using Fast Fourier Transforms (FFT) and other transforms. For example, wavelet transforms may also be used to generate different representations of the DAS data. Various frequency ranges may be used for different purposes and where low frequency signal changes may be attributed to formation strain changes or fluid movement and other frequency ranges may be indicative of fluid or gas movement. Various filtering techniques may be applied to generate indicators of events related to measuring the flow of fluid.

In some implementations, DAS measurements along the wellbore 604 may be used as an indication of fluid flow through the casing 602 in the wellbore 604. Vibrations and/or acoustic profiles may be recorded and stacked over time, where a simple approach could correlate total energy or recorded signal strength with known flow rates. For example, the fiber optic interrogation unit 612 may measure energy and/or amplitude in multiple frequency bands where changes in select frequency bands may be associated with oil, water and/or gas thus enabling multiphase production profiling along the wellbore 604.

While the aspects of the disclosure are described with reference to various implementations and exploitations, it will be understood that these aspects are illustrative and that the scope of the claims is not limited to them. In general, techniques for reservoir modeling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments can include the following:

Embodiment #1: A well tool, comprising: a cylinder; a setting chamber formed, in part, by the cylinder; and a first flow metering device and a second flow metering device installed in the cylinder, the first flow metering device and the second flow metering device configured to regulate an internal chamber pressure inside the setting chamber to reduce a collapse pressure at the cylinder.

Embodiment #2: The well tool of Embodiment #1, wherein the first flow metering device is configured to allow an external pressure greater than a first pressure threshold to enter the setting chamber during a hydrocarbon recovery operation using the well tool, and the second flow metering device is configured to allow the internal chamber pressure greater than a second pressure threshold to exit the setting chamber after the hydrocarbon recovery operation.

Embodiment #3: The well tool of Embodiment #2, wherein a pressure differential between the inside of the setting chamber and external to the cylinder during the hydrocarbon recovery operation is set by the first pressure threshold of the first flow metering device to regulate and reduce the collapse pressure at the cylinder.

Embodiment #4: The well tool of Embodiment #2, wherein the second flow metering device maintains the internal chamber pressure at the second pressure threshold after the hydrocarbon recovery operation to maintain a setting pressure within the setting chamber.

Embodiment #5: The well tool of Embodiment #1, wherein the first flow metering device is a first check valve and the second flow metering device is a second check valve.

Embodiment #6: The well tool of Embodiment #1, wherein the well tool is a well packer, the well packer configured as either a mechanical hydraulic packer or a mechanical hydrostatic packer.

Embodiment #7: The well tool of Embodiment #1, further comprising: an actuating mechanism configured to isolate the setting chamber to reduce burst pressure at the cylinder.

Embodiment #8: The well tool of Embodiment #7, further comprising: a mandrel; and a setting chamber port between the setting chamber and the mandrel, wherein the actuating mechanism is configured to isolate the setting chamber from the mandrel by sealing the setting chamber port to reduce burst pressure at the cylinder.

Embodiment #9: The well tool of Embodiment #1, wherein the well tool is a well packer configured for use in a fracturing operation for hydrocarbon recovery.

Embodiment #10: A method for regulating pressure in a well tool, comprising: isolating a setting chamber of the well tool to reduce burst pressure at a cylinder of the well tool; and regulating an internal chamber pressure inside the setting chamber using a first flow metering device and a second flow metering device installed in the cylinder of the well tool to reduce collapse pressure at the cylinder.

Embodiment #11: The method of Embodiment #10, wherein regulating the internal chamber pressure includes the first flow metering device allowing an external pressure greater than a first pressure threshold to enter the setting chamber during a hydrocarbon recovery operation using the well tool, and the second flow metering device allowing the internal chamber pressure greater than a second pressure threshold to exit the setting chamber after the hydrocarbon recovery operation.

Embodiment #12: The method of Embodiment #11, wherein regulating the internal chamber pressure includes limiting a pressure differential between the inside of the setting chamber and external to the cylinder during the hydrocarbon recovery operation to the first pressure threshold of the first flow metering device to reduce the collapse pressure at the cylinder.

Embodiment #13: The method of Embodiment #11, wherein regulating the internal chamber pressure includes maintaining the internal chamber pressure at the second pressure threshold of the second flow metering device after the hydrocarbon recovery operation to maintain a setting pressure within the setting chamber.

Embodiment #14: The method of Embodiment #10, wherein isolating the setting chamber of the well tool includes an actuating mechanism isolating the setting chamber from a mandrel of the well tool by sealing a setting chamber port to reduce burst pressure at the cylinder.

Embodiment #15: A well system for hydrocarbon recovery, comprising: well tubing; and one or more well packers, wherein each of the one or more well packers includes: a cylinder; a setting chamber formed, in part, by the cylinder; and a first flow metering device and a second flow metering device installed in the cylinder, the first flow metering device and the second flow metering device configured to regulate an internal chamber pressure inside the setting chamber to reduce a collapse pressure at the cylinder.

Embodiment #16: The well system of Embodiment #15, wherein the first flow metering device is configured to allow an external pressure greater than a first pressure threshold to enter the setting chamber during a hydrocarbon recovery operation using the one or more well packers, and the second flow metering device is configured to allow the internal chamber pressure greater than a second pressure threshold to exit the setting chamber after the hydrocarbon recovery operation.

Embodiment #17: The well system of Embodiment #16, wherein a pressure differential between the inside of the setting chamber and external to the cylinder during the hydrocarbon recovery operation is set by the first pressure threshold of the first flow metering device to regulate and reduce the collapse pressure at the cylinder.

Embodiment #18: The well system of Embodiment #16, wherein the second flow metering device maintains the internal chamber pressure at the second pressure threshold after the hydrocarbon recovery operation to maintain a setting pressure within the setting chamber.

Embodiment #19: The well system of Embodiment #15, wherein the first flow metering device is a first check valve and the second flow metering device is a second check valve.

Embodiment #20: The well system of Embodiment #15, wherein each of the one or more well packers further includes: a mandrel; a setting chamber port between the setting chamber and the mandrel; and an actuating mechanism configured to isolate the setting chamber from the mandrel by sealing the setting chamber port to reduce burst pressure at the cylinder.

What is claimed is:

1. A well tool, comprising:
   a cylinder;
   a setting chamber formed, in part, by the cylinder; and
   a first flow metering device and a second flow metering device installed in the cylinder, the first flow metering device and the second flow metering device configured to regulate an internal chamber pressure inside the setting chamber to reduce a collapse pressure at the cylinder, wherein the first flow metering device is configured to allow an external pressure greater than a first pressure threshold to enter the setting chamber during a hydrocarbon recovery operation using the well tool, the external pressure being external to the well tool, and the second flow metering device is configured to allow the internal chamber pressure greater than a second pressure threshold to exit the setting chamber after stopping the hydrocarbon recovery operation.

2. The well tool of claim 1, wherein a pressure differential between the inside of the setting chamber and external to the cylinder during the hydrocarbon recovery operation is set by the first pressure threshold of the first flow metering device to regulate and reduce the collapse pressure at the cylinder.

3. The well tool of claim 1, wherein the second flow metering device maintains the internal chamber pressure at the second pressure threshold after the hydrocarbon recovery operation to maintain a setting pressure within the setting chamber.

4. The well tool of claim 1, wherein the first flow metering device is a first check valve and the second flow metering device is a second check valve.

5. The well tool of claim 1, wherein the well tool is a well packer, the well packer configured as either a mechanical hydraulic packer or a mechanical hydrostatic packer.

6. The well tool of claim 1, further comprising:
   an actuating mechanism configured to isolate the setting chamber to reduce burst pressure at the cylinder.

7. The well tool of claim 6, further comprising:
   a mandrel; and
   a setting chamber port between the setting chamber and the mandrel,
   wherein the actuating mechanism is configured to isolate the setting chamber from the mandrel by sealing the setting chamber port to reduce burst pressure at the cylinder.

8. The well tool of claim 1, wherein the well tool is a well packer configured for use in
   a fracturing operation for hydrocarbon recovery.

9. A method for regulating pressure in a well tool, comprising:
   isolating a setting chamber of the well tool to reduce burst pressure at a cylinder of the well tool; and
   regulating an internal chamber pressure inside the setting chamber using a first flow metering device and a second flow metering device installed in the cylinder of the well tool to reduce collapse pressure at the cylinder, wherein regulating the internal chamber pressure includes the first flow metering device allowing an external pressure greater than a first pressure threshold to enter the setting chamber during a hydrocarbon recovery operation using the well tool, the external pressure being external to the well tool, and the second flow metering device allowing the internal chamber pressure greater than a second pressure threshold to exit the setting chamber after stopping the hydrocarbon recovery operation.

10. The method of claim 9, wherein regulating the internal chamber pressure includes limiting a pressure differential between the inside of the setting chamber and external to the cylinder during the hydrocarbon recovery operation to the first pressure threshold of the first flow metering device to reduce the collapse pressure at the cylinder.

11. The method of claim 9, wherein regulating the internal chamber pressure includes maintaining the internal chamber pressure at the second pressure threshold of the second flow metering device after the hydrocarbon recovery operation to maintain a setting pressure within the setting chamber.

12. The method of claim 9, wherein isolating the setting chamber of the well tool includes an actuating mechanism isolating the setting chamber from a mandrel of the well tool by sealing a setting chamber port to reduce burst pressure at the cylinder.

13. A well system for hydrocarbon recovery, comprising:
   well tubing; and
   one or more well packers, wherein each of the one or more well packers includes:
   a cylinder;
   a setting chamber formed, in part, by the cylinder; and
   a first flow metering device and a second flow metering device installed in the cylinder, the first flow metering device and the second flow metering device configured to regulate an internal chamber pressure inside the setting chamber to reduce a collapse pressure at the cylinder, wherein the first flow metering device is configured to allow an external pressure greater than a first pressure threshold to enter the setting chamber during a hydrocarbon recovery operation using the one or more well packers, the external pressure being external to the one or more well packers, and the second flow metering device is configured to allow the internal chamber pressure greater than a second pressure threshold to exit the setting chamber after stopping the hydrocarbon recovery operation.

14. The well system of claim 13, wherein a pressure differential between the inside of the setting chamber and external to the cylinder during the hydrocarbon recovery operation is set by the first pressure threshold of the first flow metering device to regulate and reduce the collapse pressure at the cylinder.

15. The well system of claim 13, wherein the second flow metering device maintains the internal chamber pressure at the second pressure threshold after the hydrocarbon recovery operation to maintain a setting pressure within the setting chamber.

16. The well system of claim 13, wherein the first flow metering device is a first check valve and the second flow metering device is a second check valve.

17. The well system of claim 13, wherein each of the one or more well packers further includes:
   a mandrel;
   a setting chamber port between the setting chamber and the mandrel; and
   an actuating mechanism configured to isolate the setting chamber from the mandrel by sealing the setting chamber port to reduce burst pressure at the cylinder.

* * * * *